G. W. BULLEY.
DUMPING APPARATUS.
APPLICATION FILED APR. 6, 1914.
1,254,977.
Patented Jan. 29, 1918.
3 SHEETS—SHEET 2.
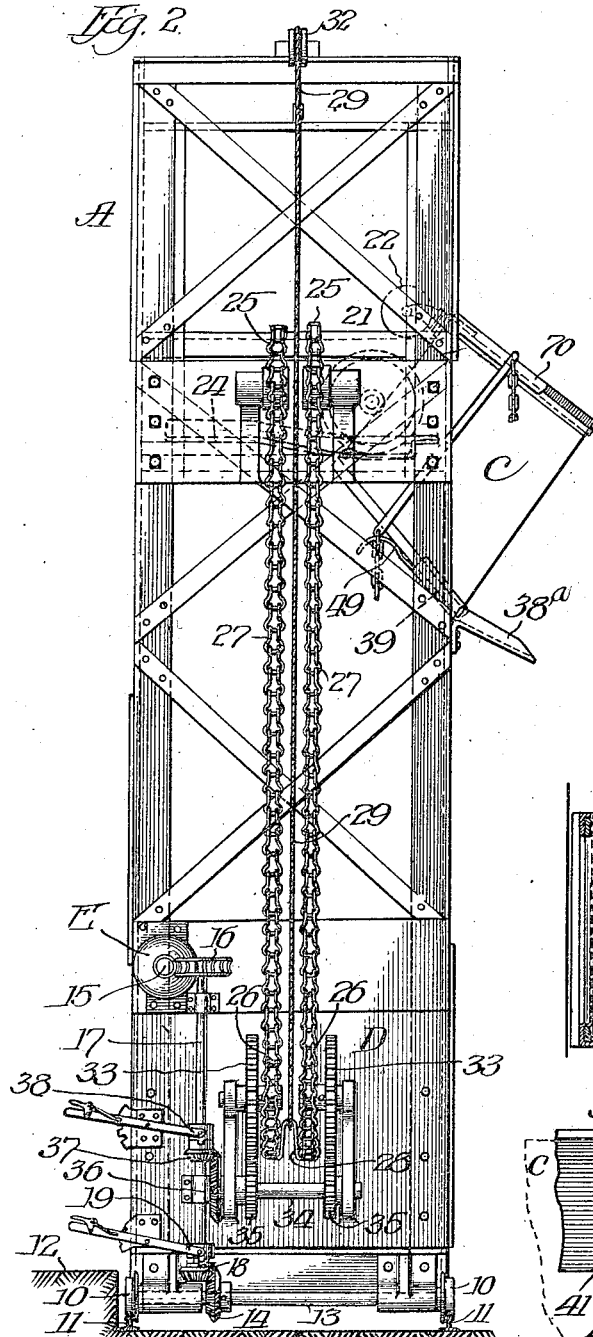
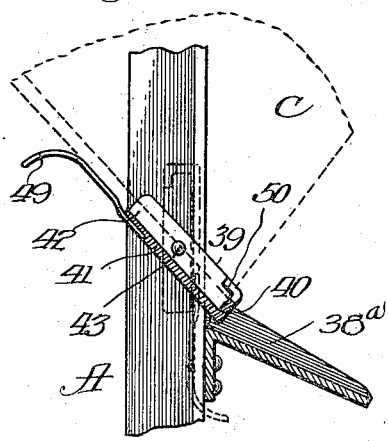
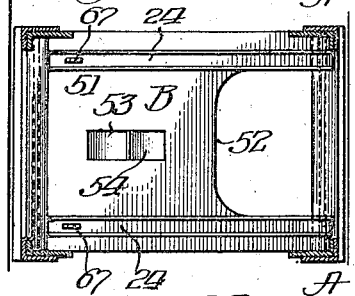
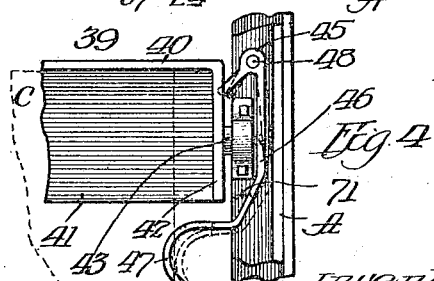

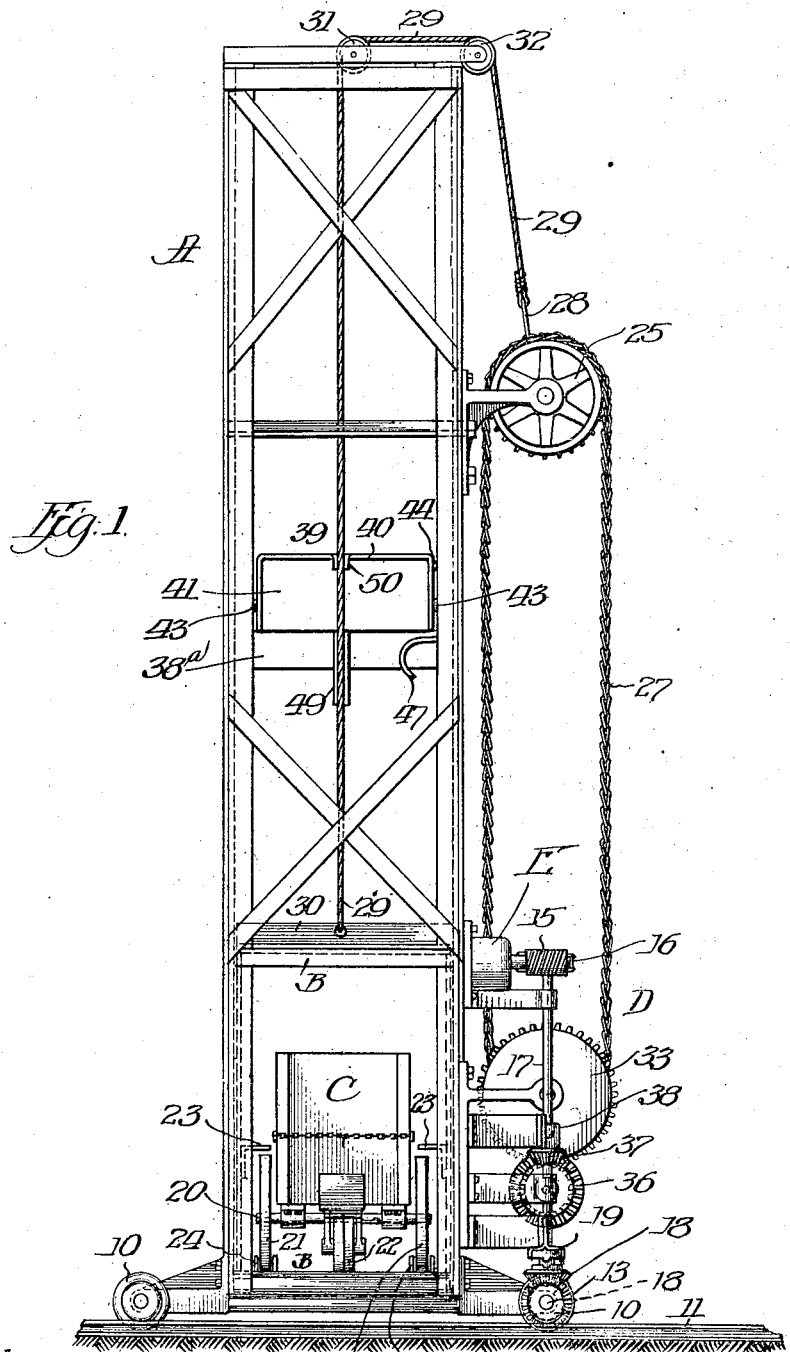

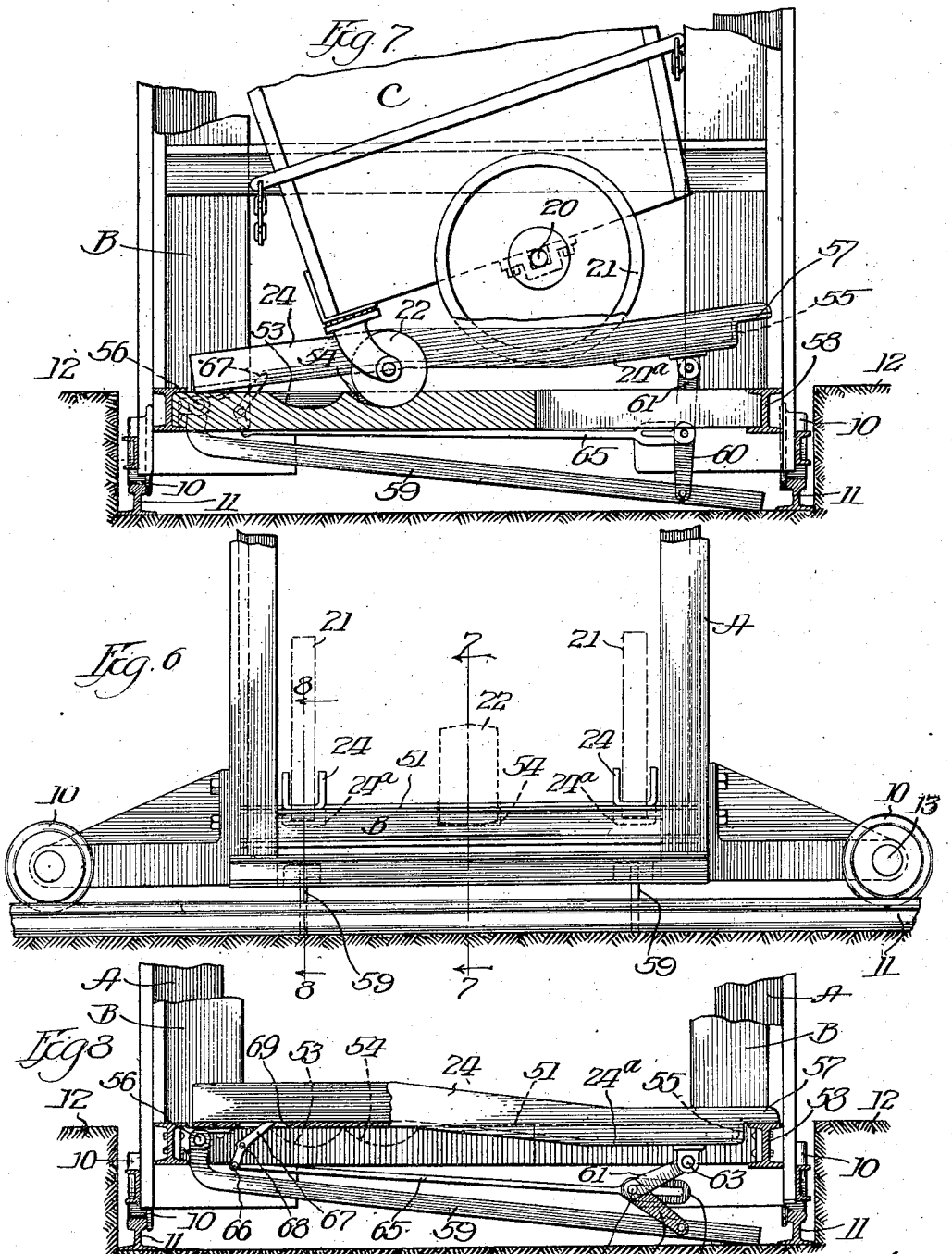

UNITED STATES PATENT OFFICE.

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

DUMPING APPARATUS.

1,254,977.        Specification of Letters Patent.      Patented Jan. 29, 1918.

Application filed April 6, 1914. Serial No. 829,783.

*To all whom it may concern:*

Be it known that I, GEORGE W. BULLEY, a citizen of the United States, residing at Chicago, in the county of Cook and State of Illinois, have invented certain new and useful Improvements in Dumping Apparatus, of which the following is a specification.

My invention relates to dumping apparatus, and has for its primary object the provision of improved apparatus of that class, which shall have improved means for receiving, dumping, and discharging containers for matter to be dumped.

With the above and other objects in view this invention consists substantially in the combination, arrangement, and construction of parts all as hereinafter described, shown in the accompanying drawings which form a part of this specification and illustrate the preferred embodiment of my invention, and more particularly set forth in the subjoined claims.

In the drawings:

Figure 1 is a front elevation of my invention, showing a dump cart positioned therein. Fig. 2 is a side elevation of the invention, illustrating the cart being dumped. Fig. 3 is a detail view of a portion of my invention, illustrated in Figs. 1 and 2, showing in dotted lines an adjusted position of the parts and in other dotted lines a portion of one end of the cart being dumped. Fig. 4 illustrates in detail a movable detent which coöperates with one of the parts illustrated in Fig. 3, an adjusted position of the detent being illustrated in dotted lines and different positions assumed by the cart being illustrated in full lines and in dotted lines respectively. Fig. 5 is a plan view of a cradle forming part of my invention and illustrates portions of the apparatus shown in Fig. 1. Fig. 6 is a view of the lower portion of the apparatus shown in Fig. 1, with parts broken away and illustrating in dotted lines the positions assumed by the wheels of a dump cart when set in the cradle. Fig. 7 is a section taken approximately on line 7—7 of Fig. 6 and illustrating a dump cart positioned in the cradle, the cradle parts being adjusted to discharge the cart. Fig. 8 is a section taken approximately on line 8—8 of Fig. 6, showing an adjusted position of parts illustrated in Fig. 7.

The reference letter A indicates generally a tower supporting and guiding a cradle B adapted to carry a dump cart C and being reciprocated in the tower by means of apparatus generally indicated by D, the apparatus D being actuated by a motor E.

The tower A is of any suitable construction and is preferably mounted upon wheels 10, which bear upon rails 11, the rails and wheels being positioned below the normal ground level 12 a distance sufficient to bring the lower surface of the cradle flush with the ground level. One pair of the wheels 10 is fixed upon an axle 13, to which is keyed a bevel gear 14. The shaft of the motor E carries a worm 15, which engages a worm wheel 16 fixed upon the upper end of a shaft 17. Rotatably carried upon the lower end of the shaft 17 is a bevel gear 18 meshing with the bevel gear 14, and any suitable clutch mechanism 19 is provided for connecting the shaft 17 to the bevel gear 18 at will to cause the motor E to propel the tower along the rails 11. The direction of travel of the tower A may be controlled by governing the direction of rotation of the armature of the motor E.

The cart C may be of any suitable type, but is preferably of the form illustrated in the drawings, wherein the box of the cart is carried upon an axle 20 and two wheels 21 journaled upon the axle, the axles and wheels being preferably positioned between the center and the rear of the cart. Preferably, the forward end of the cart is supported by a caster 22 positioned beneath the longitudinal center of the cart body. Within the cradle B and disposed horizontally upon the sides thereof are a pair of angles 23, so positioned that each extends directly over one of the wheels 21 when the cart is positioned in the cradle. Channel rails 24 are provided on opposite sides of the cradle for engagement with the wheels 21 of the cart. Upon the side of the tower A are positioned an upper pair of sprocket wheels 25 and lower pair of sprocket wheels 26, the distance from the uppermost point of the upper pair to the lowermost point of the lower pair being the distance through which it is desired to reciprocate the cradle B. The pairs of sprockets are spaced from each other and mounted upon separate bearings, there being no obstruction between them. The upper sprockets are of equal diameter and the lower sprockets are of equal diameter, the upper pair being positioned in vertical alinement with the lower pair. Two endless chains 27 are provided, each connecting one lower sprocket to the upper sprocket alined with it. By this construction, as is shown clearly in Fig. 2, an unobstructed vertical space is provided between the sprockets and chains of a length equaling the distance through which it is necessary to reciprocate the cradle B. A stirrup 28 is journaled by one branch in one of the chains 27 and by the other branch in the other chain, the journaled parts of the stirrups being in alinement. A cable 29 is attached at one end to the upper crossbeam 30 of the cradle B, passes over two pulleys 31 and 32 positioned at the top of the tower A, and has its opposite end fixed to the stirrup 28. Fixed with relation to the lower sprockets 26 are two gear wheels 33, one for each lower sprocket. Below the sprockets 26 and spanning the space between them is a horizontal shaft 34, carrying two pinions 35, each meshing with one of the gear wheels 33. The shafts 17 and 34 lie in the same plane, and a bevel gear 36 carried upon one end of the shaft 34 meshes with a bevel pinion 37 rotatably carried by the shaft 17. Any suitable clutch device is indicated at 38 for connecting the shaft 17 and the bevel pinion 37 at the will of the operator, in order to transmit the power of the motor E to the shaft 34, pinions 35, gear wheels 33, and sprockets 26. The operation of the motor E, when the clutch 38 is set, rotates the sprocket wheels 26, the endless chains 27, and the stirrup 28, causing the stirrup to travel from its lowermost position, as illustrated in Fig. 2, to its uppermost position, as illustrated in Fig. 1. When in its uppermost position, as illustrated in Fig. 1, the cradle B is positioned with its cart receiving surface flush with the ground level 12, and when the stirrup has reached its lowermost position, as shown in Fig. 2, the cradle has assumed its uppermost position adjacent a chute 38$^a$ secured to the tower at a suitable elevation.

Horizontally pivoted at its ends in the rear corner uprights of the tower A, at a point slightly above the chute 38$^a$, is a dumping bar 39, illustrated in Figs. 1, 2, 3, and 4. The dumping bar preferably takes the form of an angle bar having one narrow web 40 and one wide web 41, and provided with end flanges 42, which carry pivot pins 43 suitably journaled to the rear corner uprights. In dotted lines in Fig. 3 is illustrated the normally upright position in which the dumping bar 39 stands, and it will there be noted that the pivots 43 are positioned considerably below the narrow web 40 of the bar. This positioning of the pivots 43 at a distance from the narrow web 40 permits the narrow web 40 to be positioned above the upper end of the chute 38$^a$ when the bar assumes the dumping position illustrated in full lines in Fig 3 and in dotted lines in Fig. 2. It will further be noted, by reference to Fig. 3, that the center of gravity of the dumping bar lies rearwardly of the axis of the pivots 43. In order to maintain the dumping bar in its normally upright position a detent 44 illustrated in detail in Fig. 4 is employed. This detent comprises a bell crank 45 having one short arm 44, which is the detent proper and which is normally positioned behind the dumping bar 39 to prevent its swing out of a vertical position, and a long arm 46 bent at its lower end as at 47 to lie in the path of movement of the cart C, the bell crank being pivoted to one of the rear uprights of the tower A, as at 48. Depending from the bar 39 is a guard 49 backwardly curved at its lower extremity. A retaining finger 50 depends from the forward edge of the narrow web 40 of the bar 39. The space between the broad web 41 and the retaining finger 50 is slightly greater than the thickness of the rear web of the body of the cart C, and when in its normally upright position the narrow web 40 registers directly above the rearward web of the body of the cart C, as the cart stands positioned in the cradle B.

In Fig. 5 is illustrated in plan the bed or cart carrying surface of the cradle B, the four uprights of the cradle and the four uprights of the tower A being illustrated in section. It will there be noted that the bed 51 of the cradle is cut away in its rearward portion between the channel rails 24, as at 52, this cutaway portion admitting of the dumping of the cart, as illustrated in Fig. 2. A forward depression 53 and a rearward depression 54 are provided adjacent each other on the longitudinal center line of the bed 51. When the cart C is rolled upon the bed of the cradle the caster 22 engages the depression 53, limiting the movement of the cart on the cradle. When the cart is dumped the caster 22 oscillates into the position illustrated in Fig. 2, and upon the return of the cart to a standing position within the cradle the caster 22 engages the depression 54 to retain the cart from casual displacement in the cradle.

In Figs. 6, 7, and 8 are illustrated the cart receiving and discharging features of the cradle. At their rearward ends, as at 24$^a$, the channel rails 24 are depressed a distance equal to the depth of the depressions 53 and 54. By this construction it will be noted that when the cart is rolled upon the bed of the cradle B the whole cart is lowered from the level of the bed proper 51, by the dropping of the wheels 21 at the rearward ends 24ᵃ of the channel rails and by the dropping of the caster 22 into the depressions 53. At their rear ends the channel rails 24 are provided with end guards 55, which assist in positioning the cart in the cradle and preventing its backward escape therefrom. At their forward ends the channel rails 24 are mounted for oscillation upon horizontal pivots 56 and at their rearward ends they are provided with overlapping fingers 57 which rest upon the rear frame piece 58 of the cradle. Journaled at its forward end for oscillation about pivot 56 is a toggle rod 59, which extends below the cradle bed and adjacent its end is connected to the lower arm 60 of a toggle. The upper arm of the toggle is indicated at 61 and the two arms of the toggle are pivoted upon a common pin 62. The free end of the upper arm 61 is pivoted to the rearward end 24ᵃ of the channel rail, as at 63. The toggle rod 59 and the toggle parts 60, 61, 62, and 63 are duplicated beneath each channel rail. Tripping mechanism for the toggle just described is positioned below each channel rail 24, and comprises a link 64 engaging the pin 62 and provided with a trigger rod 65, which extends forwardly of the toggle arms, and is pivoted as at 66 to the lower arm of a trigger 67. The trigger 67 is pivoted in the bed 51 of the cradle, as at 68, and extends through an aperture 69 provided in the forward portion of the channel rail 24. The cart receiving position of the parts of the cradle B is illustrated in Fig. 8, wherein it will be seen that the toggle mechanism is collapsed. With the cart positioned within the cradle the wheels and caster assume the positions shown in Fig. 6. When the cradle rises from the position illustrated in Fig. 8 the toggle mechanism opens by reason of the weight of the toggle rod 59 into a position where the toggle arms 60 and 61 are upon a dead center. The cradle rises and dumps the cart, as illustrated in Fig. 2, and returns to the ground level 12. Upon its return, by reason of the straightened position of the toggle arms the contact of the bar 59 with the ground elevates the rearward ends 24ᵃ of the channel rails into the position shown in Fig. 7, the elevation being preferably sufficient to discharge the cart from the cradle. As the cart wheels 21 roll from the forward ends of the channel rails 24 they depress the trigger 67 and collapse the toggle arms 60 and 61 into the position shown in Fig. 8; it being understood that upon the straightening of the toggle when the cradle rose from the ground level the link 64 was pulled backwardly, extending the trigger 67 through the aperture 69 into a position to be tripped by the wheels 21.

In the operation of my invention the cart C is backed upon the cradle, the wheels 21 engaging the channel rails 24, and the whole cart, as previously described, dropping into position at the rear ends of the channel bars and into the depression 53. This is done when the cradle parts are in the position illustrated in Fig. 8. The clutch 38 being closed and the clutch 19 being open, the motor E is started to elevate the cradle from the position illustrated in Fig. 1. As the cradle rises the rear web of the cart engages the guard 49, the guard assuming a position in contact with the outer face of the rear web of the cart. Continuing in its ascent, the rearward portion of one side of the cart (see Fig. 4) engages the bent portion 47 of the bell crank 45, pushing the detent 44 outwardly from its engagement with the dumping bar 39 and releasing that dumping bar for pivotal action. In full lines in Fig. 4 is shown a fragment of the upper portion of the cart C as it comes in contact with the bent portion 47 of the bell crank 45, and in dotted lines in Fig. 4 are shown both the adjusted position of the bell crank 45 and detent 44, and the position assumed by the cart when it has risen to the level of the lower surface of the narrow web 40. The guard 49 being in contact with the rear surface of the cart C, the release of the detent 44 from engagement with the dumping bar causes no oscillation of the dumping bar at that time. The cart, however, continues in its upward movement upon the cradle, bringing the rear web of the cart into position within the dumping bar, as illustrated in dotted lines in Fig. 3. In this position the finger 50 is projected slightly within the interior of the cart, and the ascent of the upper rearward corner of the cart is arrested. The cradle, continuing in its upward movement, exerts through the channel rails 24 and wheels 21 an upward impulse upon the body of the cart, causing the cart, the upper rearward corner of which is caught in the dumping bar 39, to oscillate with the dumping bar about the pivots 43 until it assumes the position illustrated in Fig. 2, wherein the contents of the cart are dumped upon the chute 38ᵃ. To limit the outward movement of the cart when being dumped a catch 70 of any suitable construction is provided, secured to the rearward portion of the tower A, comprising preferably a stirrup of metal so positioned as to catch and hold the forward end of the cart. When the cart is in the position shown in Fig. 2 the stirrup 28 is at the lowermost point of its path of travel and the cradle B, consequently, at the upward limit of its path of movement. The continued operation of the motor E causes the cradle to begin its downward movement, which permits the cart to oscillate downwardly about the pivots 43 into its position of rest within the cradle, the only change in position of the cart upon the cradle from that assumed as the cradle rose being that the caster 22 has turned about and in the downward movement of the cradle engages the depression 54 instead of the depression 53. If for any reason the cart should fail of its own weight to oscillate downwardly from the dumping position shown in Fig. 2 the lowering of the cradle will cause contact of the angles 23 upon the upper portions of the wheels 21 and force a downward oscillation of the cart about the pivots 43. During the lowering of the cradle, after the cart has assumed an upright position therein, a spring member 71 (see Fig. 4) causes a return of the detent 44 into locking engagement behind the dumping bar 39 as the cart passes the lower end 47 of the bell crank 45. As described above, during the upward travel of the cradle the toggle bar 59 by its weight caused the opening of the toggle mechanism of both channel bars 24. As the cradle nears the ground level in its downward travel the straightened or opened toggles elevate the rear ends 24ª of the channel bars 24 when the rear end of the bar 59 strikes the ground until, when the bed 51 of the cradle has been lowered flush with the ground level, the channel bars assume the inclined position illustrated in Fig. 7, which is preferably sufficient to cause the cart to roll out even against the retarding effect of the forward incline of the depression 54 upon the caster 22. If preferred, however, the elevation of the rear ends of the channel rails may be not sufficient to cause the cart to roll out of its own weight and, instead, a very slight pull upon the cart will give it a start sufficient to cause it to be discharged from the cradle. As the wheels 21 pass over the triggers 67 they depress those triggers, collapse the toggles below the channel bars, and allow the channel bars to drop again into the cart receiving position illustrated in Fig. 8.

In the dumping of the cart the rear end of the cart, being positioned against the narrow web 40, will be projected above the upper end of the chute 38ª and will, therefore, discharge its contents upon the chute. It is an advantage of my invention that by means of the endless chains 27 and the stirrup 28 journaled in them, the cradle is given a definite path of reciprocation beyond which the motor cannot urge it, it being apparent that the continued rotation of the motor will move the cradle only from the cart receiving position at the bottom of the tower to the upper dumping position at the top of the tower and back, and that no harm can come either to the cradle or the cart through the continued operation of the motor, regardless of the direction in which it turns.

In the accompanying drawings and in the foregoing description is set forth the preferred embodiment of my invention, but it is obvious that one skilled in the art may make modifications thereof without departing from the spirit of the invention.

I claim:

1. The combination with a cart to be dumped, of dumping apparatus combining a tower, a cradle mounted for vertical reciprocation within the tower and adapted to receive and carry the cart, a horizontally pivoted dumping bar positioned to engage one end of the cart during the travel of the cradle and oscillate the cart from an upright position in the cradle to a dumping position and back to an upright position, and a catch to limit the oscillation of the cart when it has reached a dumping position.

2. The combination with a cart to be dumped, of dumping apparatus combining a tower, a cart carrying cradle mounted for reciprocation in the tower, means for reciprocating the cradle, a dumping bar horizontally pivoted in the tower and adapted to engage one end of the cart, and releasable locking means for the dumping bar operable by the cart.

3. The combination with a cart, of a cart carrying cradle, means for vertically reciprocating the cradle, wheel receiving rails upon the cradle horizontally pivoted at their forward ends, rail elevating means operable during the ascent of the cradle and contacting with the ground during the descent of the cradle to elevate the rearward ends of the rails, and tripping apparatus for closing the rail elevating means.

4. The combination with a cart, of a cart carrying cradle, means for vertically reciprocating the cradle, wheel receiving rails horizontally pivoted at their forward ends in the bed of the cradle and rail elevating toggles carried by the rails, operable during the ascent of the cradle and contacting with the ground during the descent of the cradle to elevate the rearward ends of the rails.

5. The combination with a cart, of a cart carrying cradle, means for vertically reciprocating the cradle, wheel receiving rails pivoted at their forward ends to the forward portion of the cradle and carried by the cradle, toggle mechanism carried by each rail arranged to open and lock upon the ascent of the cradle, and contact with the ground and elevate the rearward ends of the rails during the descent of the cradle to discharge the cart from the cradle, and toggle tripping means operated by the cart during its discharge.

6. The combination of a cart, a cart carrying cradle, means for vertically reciprocating the cradle, means operable during the descent of the cradle to elevate the rearward end of the cart carrying portion of the cradle to discharge the cart from the cradle, and means operable by the cart during its discharge to lower the elevated cart carrying portion of the cradle.

7. The combination with a cart, of a cart carrying cradle, means for vertically reciprocating the cradle, rails for engagement with and support of the wheels of the cart and horizontally pivoted at their forward ends, toggle mechanism carried by the rails adapted to open during the ascent of the cradle and to contact with the ground and elevate the rearward ends of the rails during the descent of the cradle to discharge the cart, tripping apparatus for the toggle mechanism, and triggers lying in the path of the discharging cart and actuated thereby to operate the toggle tripping apparatus.

8. The combination with a cart, of a cart carrying cradle, means for vertically reciprocating the cradle, rails carried by the cradle for support of the cart wheels and horizontally pivoted at their forward ends, triggers adapted to be projected into the path of the cart wheels and positioned adjacent the forward ends of the rails, toggles carried adjacent the rearward ends of the rails and links connecting the toggles with the triggers, said toggles opening and locking on dead centers during the ascent of the cradle and simultaneously actuating the links to project the triggers and during the descent of the cradle contacting with the ground and elevating the rearward ends of the rails.

9. The combination with a cart, of a cart carrying cradle, means for vertically reciprocating the cradle, rails carried by the cradle for support of the cart wheels and horizontally pivoted at their forward ends, triggers adapted to be projected into the path of the cart wheels and positioned adjacent the forward ends of the rails, toggles carried adjacent the rearward ends of the rails, links connecting the toggles with the triggers, said toggles opening and locking on dead centers during the ascent of the cradle, and simultaneously actuating the links to project the triggers and during the descent of the cradle, contacting with the ground and elevating the rearward ends of the rails, said toggles being collapsible by the links and triggers.

10. The combination with a cart, of a vertically reciprocating cart carrying cradle, combining two channel rails for the wheels of the cart and horizontally pivoted to the cradle at their forward ends, means operable during the descent of the cradle to adjust the rails into cart discharging position, and means operable by the cart during its discharge to return the rails to cart receiving position.

11. The combination with a cart, of a vertically reciprocating cart carrying cradle combining rails horizontally pivoted at their forward ends in the cradle, gradually depressed from a point adjacent their forward ends to a point adjacent their rearward ends, means operable during the descent of the cradle to oscillate the rails about their pivots, and means operable by the cart in its discharge to return the rails to cart receiving position.

12. The combination with a cart, of a vertically reciprocating cart carrying cradle, comprising a bed, rails for engagement by the wheels of the cart horizontally pivoted in the bed at their forward ends, toggle bars horizontally pivoted below the rails to the forward portion of the bed, toggle arms pivoted at their adjacent ends to each other and at their opposite free ends to the rails and the bars respectively, connecting links each slotted at one end for engagement with the pivot joining the toggle arms, triggers each pivoted in the bed intermediate its extremities, connected at one extremity to one link and having its other end adapted to be projected into the path of movement of one of the cart wheels, said toggle bars being of sufficient weight to aline the toggle arms upon dead centers to project the triggers into the paths of the wheels during the ascent of the cradle end of sufficient length to contact with the ground during the descent of the cradle, said toggle arms being of sufficient length to oscillate the rails into cart discharging position when the toggle bars contact with the ground during the descent of the cradle and said links and triggers being operable to collapse the toggle arms and return the rails into cart receiving position by contact between the cart wheels and the projected triggers.

13. The combination of a cart elevating mechanism embodying a cart supporting cradle, a cart having wheels forming a rolling support on the cradle on which the cart bodily moves into dumping position, and means interposed in the path of the moving cart for holding the cart to provide a pivot about which the cart bodily rotates into dumping position while the cart is being elevated.

14. The combination of a tower, a dump cart elevating mechanism movable in said tower, a wheeled cart movably supported on said mechanism, and a relatively stationary pivot mechanism interposed in the path of the cart and operable to engage the cart and provide a pivot about which the cart is bodily rotated into and out of position by the movement of the elevating mechanism.

15. The combination of an elevator tower, a vertical traveling elevator in said tower, a wheeled cart carried by said elevator with its wheels freely movable on the elevator, and a relatively stationary pivot member cooperating with said elevator as the elevator moves to engage the cart and bodily rotate the cart about said pivot.

16. The combination of an elevator shaft, an elevator arranged to travel therein, a dumping device arranged to hold one side of the cart while it is traveling with the elevator, and mechanism for raising and lowering the elevator while the end of the cart is being held to roll the cart on its wheels on said elevator and thus rotate the cart into dumping position on the elevator and restore it to normal position.

17. The combination of an elevator shaft, a dump cart elevator having tracks upon which the wheels of the dump cart roll in the act of dumping the cart, dumping mechanism arranged to engage the cart and serve as a pivotal point about which the cart is bodily rotated into dumping position and back to normal by the rise and fall of the elevator, and power mechanism for raising and lowering said elevator.

18. The combination of an elevator tower, a dump cart elevator arranged to travel up and down therein and having supporting rails upon which the wheels of the dump cart travel in the act of rotating the cart, a relatively stationary dumping device positioned in the path of and arranged to engage the cart at one side thereof and cause the cart to rotate bodily about a pivotal center on said mechanism into and out of dumping position while the elevator travels, and power driven lifting mechanism for the elevator.

19. The combination of an elevator tower, dumping mechanism supported by the elevator and comprising a relatively movable cart supporting elevator upon which the cart moves bodily and a relatively fixed cart holding device providing a pivot about which the cart rotates.

20. The combination of an elevator tower, a dump cart elevator arranged to travel up and down therein and having substantially horizontal upper and lower guide rails on which the wheels of the cart travel during the dumping operation, a rotatable dumping mechanism relatively fixed with respect to the movement of the cart and arranged to engage the cart at one side thereof and cause the cart to rotate bodily about said dumping mechanism as a center while the elevator travels up and down, and means for raising and lowering the elevator.

21. The combination of a wheeled cart, an elevator for the cart having pivoted rails upon which the cart runs, rail tilting mechanism operable when the elevator reaches its lower position to tilt the rails and discharge the cart from the elevator, and means controlled by the cart when leaving said elevator for actuating said tilting mechanism to lower the rails about their pivots.

In testimony whereof I have signed my name to this specification, in the presence of two subscribing witnesses, on this 2nd day of April, A. D. 1914.

GEORGE W. BULLEY.

Witnesses:
CHARLES H. SEEM,
H. G. ROCKWELL.